(12) United States Patent
Saw et al.

(10) Patent No.: US 10,063,170 B2
(45) Date of Patent: Aug. 28, 2018

(54) METHODS AND APPARATUS FOR ROBUST AND EFFICIENT STEPPER MOTOR BEMF MEASUREMENT

(71) Applicant: TEXAS INSTRUMENTS INCORPORATED, Dallas, TX (US)

(72) Inventors: Sooping Saw, McKinney, TX (US); Rakesh Raja, Allen, TX (US); Anuj Jain, Lewisville, TX (US); Matthew Hein, Plano, TX (US)

(73) Assignee: Texas Instruments Incorporated, Dallas, TX (US)

( * ) Notice: Subject to any disclaimer, the term of this patent is extended or adjusted under 35 U.S.C. 154(b) by 0 days.

(21) Appl. No.: 15/619,128

(22) Filed: Jun. 9, 2017

(65) Prior Publication Data
US 2017/0366123 A1  Dec. 21, 2017

Related U.S. Application Data

(60) Provisional application No. 62/350,428, filed on Jun. 15, 2016.

(51) Int. Cl.
*H02P 8/14* (2006.01)

(52) U.S. Cl.
CPC ..................... *H02P 8/14* (2013.01)

(58) Field of Classification Search
CPC ..................... H02P 8/00; H02P 8/14
USPC .......................................... 318/685
See application file for complete search history.

(56) References Cited

U.S. PATENT DOCUMENTS

| 4,255,693 | A |   | 3/1981 | Keidl |
| 4,480,218 | A |   | 10/1984 | Hair |
| 4,520,302 | A | * | 5/1985 | Hill ........................ H02P 8/12 318/685 |
| 4,642,544 | A | * | 2/1987 | Furumura ............... H02P 8/18 318/685 |
| 4,757,241 | A | * | 7/1988 | Young ..................... H02P 6/14 318/400.13 |

(Continued)

FOREIGN PATENT DOCUMENTS

GB    2528114 A    1/2016

OTHER PUBLICATIONS

Search Report, International Application No. PCT/US 2017/037749, dated Oct. 12, 2017.

(Continued)

*Primary Examiner* — Kawing Chan
(74) *Attorney, Agent, or Firm* — Lawrence J. Bassuk; Charles A. Brill; Frank D. Cimino

(57) ABSTRACT

In a described example an apparatus includes: an FET driver circuit configured to supply current to a coil in a stepper motor, the FET driver circuit configured to regulate the current to the coil using a fixed delta current; a current chopper pulse width modulated circuit coupled to the FET driver circuit configured to supply pulses corresponding to a step control signal and a direction control signal; a back electromotive force (BEMF) monitor coupled to the current chopper circuit configured to measure an off time pulse and to output a BEMF monitor signal; and a controller coupled to the current chopper pulse width modulated circuit to supply the step and direction control signals and coupled to receive the BEMF monitor signal.

15 Claims, 8 Drawing Sheets

(56) References Cited

U.S. PATENT DOCUMENTS

| | | | | |
|---|---|---|---|---|
| 5,423,192 A * | 6/1995 | Young | H02P 6/08 | |
| | | | 62/215 | |
| 5,663,618 A * | 9/1997 | Adachi | H02P 6/182 | |
| | | | 318/400.35 | |
| 5,780,983 A * | 7/1998 | Shinkawa | H02P 6/182 | |
| | | | 318/400.04 | |
| 7,271,993 B2 * | 9/2007 | Plojhar | H02M 7/53803 | |
| | | | 318/293 | |
| 7,321,223 B2 * | 1/2008 | Hachiya | H02M 3/156 | |
| | | | 323/224 | |
| 7,518,328 B2 * | 4/2009 | Balsiger | H02P 6/182 | |
| | | | 318/400.22 | |
| 7,560,893 B2 * | 7/2009 | Thomson | H02P 8/12 | |
| | | | 318/400.11 | |
| 7,804,378 B2 * | 9/2010 | Krause | H03K 7/08 | |
| | | | 323/351 | |
| 7,812,562 B2 | 10/2010 | Russ | | |
| 7,816,899 B2 * | 10/2010 | Iwamura | H02M 3/1588 | |
| | | | 323/282 | |
| 8,054,017 B2 * | 11/2011 | Baba | H02P 6/21 | |
| | | | 318/400.11 | |
| 8,072,165 B2 * | 12/2011 | Baba | H02P 6/21 | |
| | | | 318/400.11 | |
| 8,164,293 B2 * | 4/2012 | Flanary | H02P 29/032 | |
| | | | 318/444 | |
| 8,183,810 B2 * | 5/2012 | Flanary | F04B 49/106 | |
| | | | 318/437 | |
| 8,297,369 B2 * | 10/2012 | Gamble | G05B 11/06 | |
| | | | 169/14 | |
| 8,358,092 B2 * | 1/2013 | Nachev | H02P 6/08 | |
| | | | 318/400.01 | |
| 8,531,145 B2 * | 9/2013 | Cardoletti | H02P 6/18 | |
| | | | 318/400.27 | |
| 8,736,298 B2 | 5/2014 | De Cock | | |
| 8,902,620 B2 * | 12/2014 | Mabuchi | H02M 7/48 | |
| | | | 363/124 | |
| 9,088,238 B2 * | 7/2015 | Bateman | H02P 6/182 | |
| 9,225,276 B2 * | 12/2015 | You | H02P 8/38 | |
| 2004/0066163 A1 * | 4/2004 | Yoo | F04B 35/045 | |
| | | | 318/632 | |
| 2004/0067140 A1 * | 4/2004 | Yoo | F04B 35/045 | |
| | | | 417/44.1 | |
| 2007/0170910 A1 * | 7/2007 | Chang | H01C 1/16 | |
| | | | 333/172 | |
| 2008/0224639 A1 | 9/2008 | Balsiger | | |

OTHER PUBLICATIONS

David Swanson and Radek Stejskal, "Back EMF method detects stepper motor stall: Pt. 1—The basics", EE Times, Oct. 27, 2011, retrieved Jun. 9, 2017 at http://www.eetimes.com/document.asp?doc_id=1279185.

* cited by examiner

METHODS AND APPARATUS FOR ROBUST AND EFFICIENT STEPPER MOTOR BEMF MEASUREMENT

CROSS-REFERENCE TO RELATED APPLICATIONS

This application claims the benefit of priority under 35 U.S.C. § 119(e) to U.S. Provisional Patent Application Ser. No. 62/350,428, filed Jun. 15, 2016, titled "ROBUST AND COST EFFICIENT METHOD AND CIRCUIT TO MEASURE STEPPER BEMF," naming Sooping Saw et. al. as inventors, which application is hereby incorporated by reference in its entirety herein.

TECHNICAL FIELD

This disclosure relates generally to stepper motors, and more particularly to stepper motors with a back electromotive force (BEMF) measurement.

BACKGROUND

Stepper motors are externally commutated motors commonly used for positional tasks. An open loop methodology is used to control and operate stepper motors. In this open loop methodology, a controller sends commutation signals to the motor. In open loop control it is assumed that the motor responds to the controller signals. Position is then determined from the expected motor response. For lightly loaded motors and at low speeds, the open loop methodology works well. However, in an open loop stepper motor control system, the rotor may not commutate to the desired position for several reasons, including: random electrical noise; high loads; impulse loads; and/or opens in the control lines or motor windings. These possible failures make open loop control systems undesirable in many position critical applications.

A closed loop methodology is sometimes used in systems to confirm that the stepper motor follows the commutation signals from the controller. Positional feedback can be monitored in several ways, such as adding a rotational encoder to the stepper motor shaft or by adding a linear encoder to another moving part of the system. These methods of confirming positional movement add additional complexity, require additional hardware and add additional cost to the overall system. In motor control, a back electromotive force (BEMF) voltage is used in some externally commutated motors to sense the movement of the rotor. When a motor is driven with a current, a counter electromotive force pushes against the current. In electric motors, the motor has coils that cut across a magnetic field as the coils rotate. The motor therefore acts as a generator even at the same time as it rotates as a motor. The BEMF voltage that results is proportional to the motor speed and position, and so is used to indirectly measure the motor speed and position. The typical BEMF voltage measurement process starts by idling drive transistors that supply potential to the motor, waiting a sufficient time for transient voltages to discharge, and then measuring a voltage due to BEMF. However, using these methods of measuring BEMF in a stepper motor has limitations. In a full step mode for a stepper motor, there is no time when the current in the motor windings is zero, so the BEMF voltage measurement cannot be made. In other operation modes the time available for the BEMF voltage measurement, after time for the initial magnetic field to decay, is quite short. Improvements are needed and desirable.

SUMMARY

In a described example an apparatus includes: an FET driver circuit configured to supply current to a coil in a stepper motor, the FET driver configured to regulate the current to the coil using a fixed delta current; a current chopper pulse width modulated circuit coupled to the FET driver circuit configured to supply pulses corresponding to a step control signal and a direction control signal; a back electromotive force (BEMF) monitor coupled to the current chopper circuit configured to measure an off time pulse and to output a BEMF monitor signal; and a controller coupled to the current chopper pulse width modulated circuit to supply the step and direction control signals and coupled to receive the BEMF monitor signal.

DETAILED DESCRIPTION

Corresponding numerals and symbols in the different figures generally refer to corresponding parts unless otherwise indicated. The figures are not necessarily drawn to scale. The term "coupled" may include connections made with intervening elements, and additional elements and various connections may exist between any elements that are "coupled."

A stepper motor provides precise mechanical motion in response to pulsed signals. Unlike DC brushed motors that run at speeds determined by electrical potentials, the stepper motor rotates from one position to another in a precise incremental rotation in each step. A controller provides the pulsed signals needed to advance the stepper motor. A stepper motor may have a toothed iron gear that aligns to magnets surrounding the gear. The gear changes position in response to current applied to coils. A pulse width modulation (PWM) circuit may apply pulses to the coils.

Figure 1:
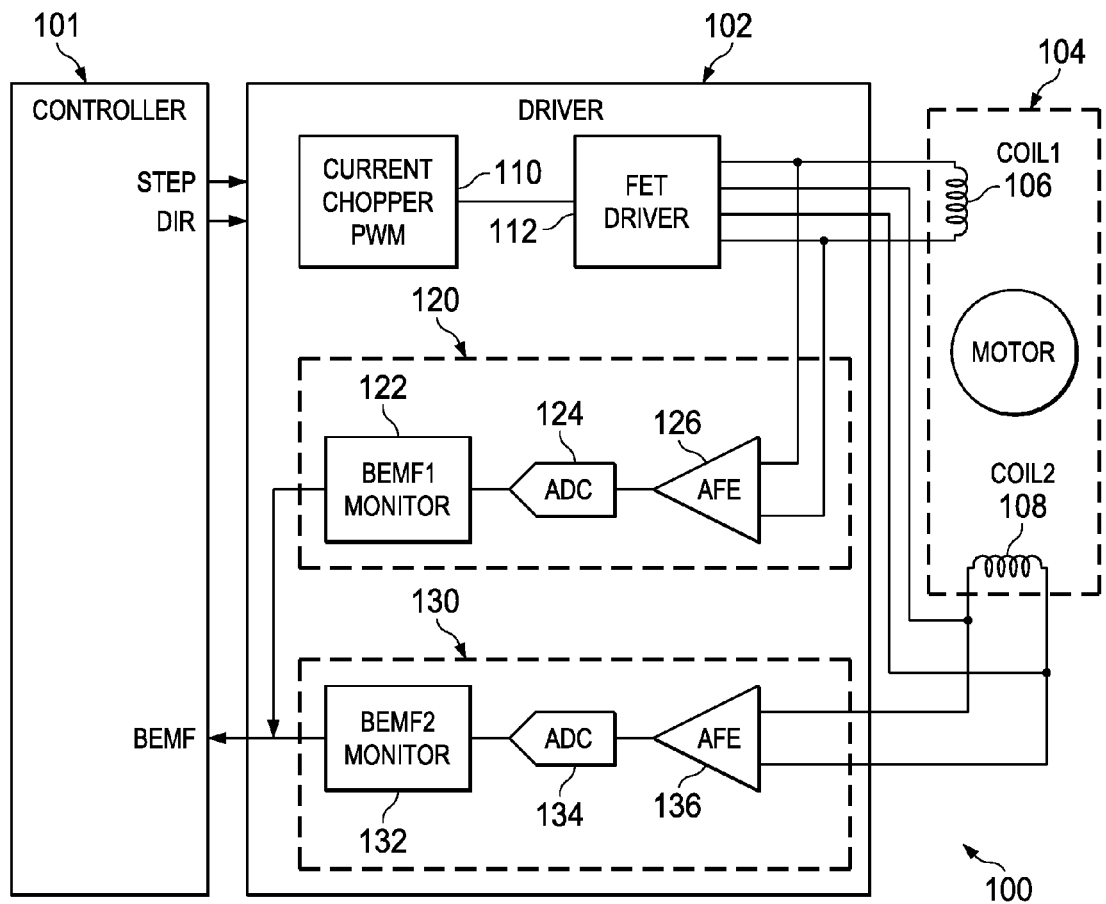
FIG. 1 is a block diagram of a stepper motor controller, stepper motor driver and stepper motor with direct BEMF measuring and feedback.

FIG. 1 is a block diagram of a system including a stepper motor controller, stepper motor driver and a stepper motor with direct BEMF measuring and feedback. System 100 has a stepper motor controller, CONTROLLER 101, stepper motor diver, DRIVER 102, and a stepper motor, MTR 104. Within the stepper motor 104, a pair of coils COIL1 106, and COIL2 108, are shown. Within the stepper motor driver DRIVER 102, there are four blocks: CURRENT CHOPPER PWM 110, FET DRIVER 112, BEMF1 section 120 and BEMF2 section 130. BEMF1 section 120 contains three blocks: BEMF1 monitor 122, analog to digital converter (ADC) 124 and analog front end (AFE) 126. BEMF2 section 130 contains three blocks: BEMF2 MONITOR 132, ADC 134 and AFE 136.

CONTROLLER 101 has at least two outputs, STEP and DIR, coupled to the DRIVER 102. CONTROLLER 101 receives an input BEMF from DRIVER 102. CURRENT CHOPPER PWM 110 is coupled to FET DRIVER 112. COIL1 106 is coupled to FET DRIVER 112 and AFE 126. AFE 126 is coupled to ADC 124 which is coupled to BEMF1 MONITOR 122. COIL2 108 is coupled to the FET DRIVER 112 and AFE 136. AFE 136 is coupled to ADC 134 which is coupled to BEMF2 MONITOR 132.

In operation, the CONTROLLER 101, which can be a microprocessor, microcontroller unit (MCU) or other logic device, provides step and direction signals STEP and DIR to the DRIVER 102. The STEP and DIR signals indicate a step distance and the direction of the step that the stepper motor is to move to. In response to the step and direction signals, the DRIVER 102 activates the CURRENT CHOPPER PWM 110 to provide peak current regulated signals to the FET DRIVER 112. In peak current regulation, at the beginning of a pulse width modulated (PWM) cycle, the DRIVER 112 applies a high voltage to a coil and the coil current is monitored as it increases. When the current reaches a predetermined limit, the potential is turned off to the coil, and the coil current decays for a fixed off time. In each cycle, the FET DRIVER 112 drives COIL1 106 and COIL2 108 to supply current to the coils of the motor. The CURRENT CHOPPER PWM 110 outputs pulses to the FET DRIVER to modulate an on-time signal to control the on time that a potential is applied to the coils. Because the circuit "chops" off the current when it reaches the predetermined limit, the circuit 110 is referred to as a "current chopper". Thus the system uses pulse width modulation (PWM) to regulate the current. The BEMF1 section 120 monitors COIL1 106 for a time that the drive current is zero. After the drive current is zero, the AFE 126 senses and amplifies the BEMF voltage. The AFE 126 outputs an analog signal, the ADC 124 digitizes the signal and sends the digital information to the BEMF1 MONITOR 122. A similar process happens with the BEMF2 section 130. The BEMF2 section 130 monitors COIL L2 108 for a time that the drive current is zero. After the drive current is zero, the AFE 136 amplifies the BEMF voltage to a range enabling the ADC 134 to digitize and send the information to the BEMF2 MONITOR 132. The CONTROLLER 101 receives the BEMF input and incorporates the BEMF information when supplying subsequent step and direction signals.

Figure 2:
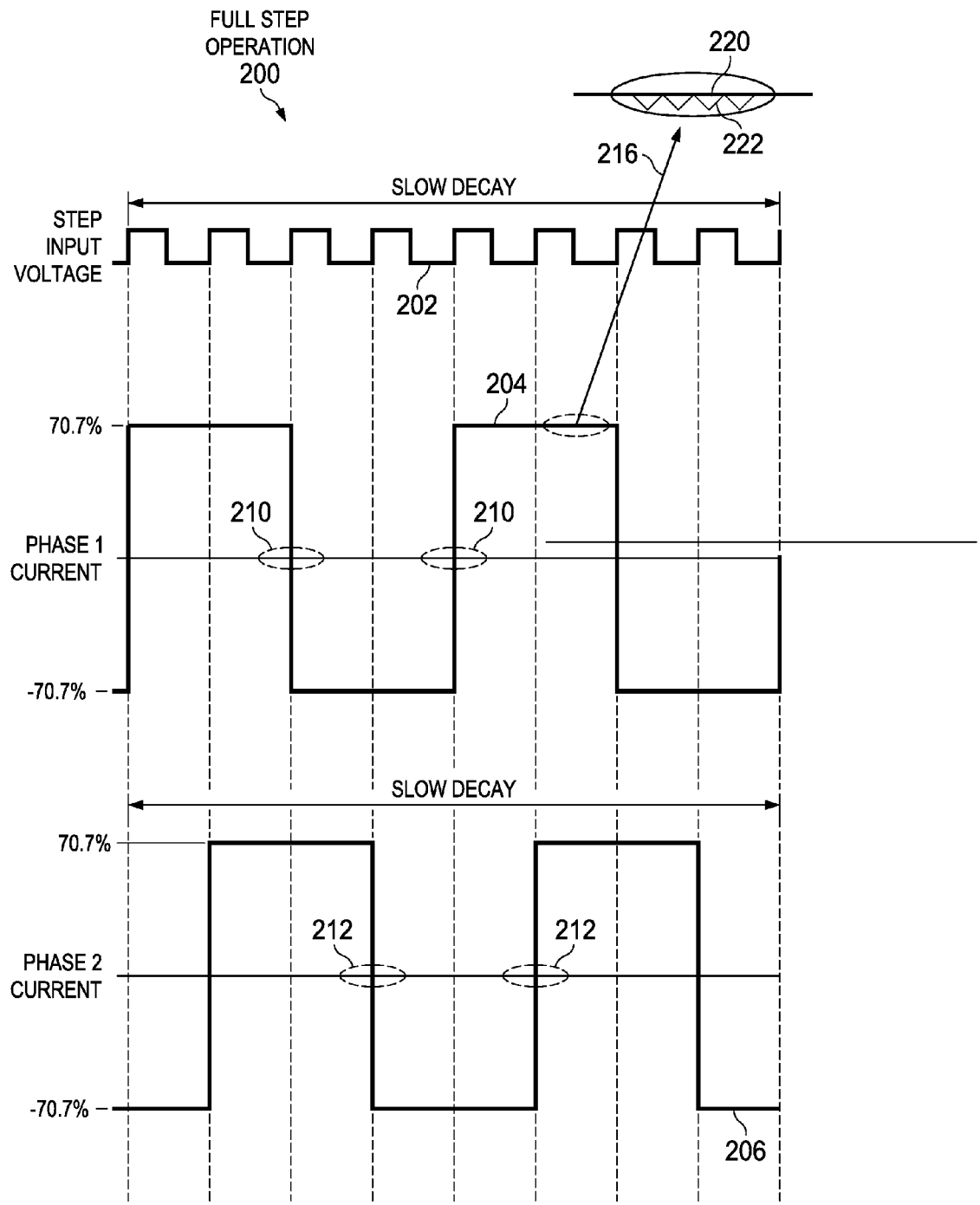
FIG. 2 is a graph showing the phase currents of a stepper motor in full step operation.

FIG. 2 is a graph 200 showing the phase currents of a stepper motor in a full step operation. The horizontal axis is time for the graph 200, and the vertical axis is voltage for the STEP INPUT 202 signal, the current for the PHASE 1 CURRENT waveform 204, and current for the PHASE 2 CURRENT waveform 206. The phase waveforms are shown as steady state current levels, however enlargement 216 of a portion of the PHASE 1 CURRENT waveform more accurately shows that the steady state line 220, representing the almost constant current level, is comprised of a series of small saw tooth current ramps 220 that are timed by the CURRENT CHOPPER 110 of FIG. 1 and produced by the FET DRIVER 112 of FIG. 1. The current is regulated to maintain the approximately constant current level using the PWM signals to the FET DRIVER circuit described hereinabove.

In full step stepper motor operation, neither of the phases PHASE 1 and PHASE 2 are in a non-driven period, which leaves no opportunity to directly measure the BEMF voltage. The zero crossings 210 in the PHASE 1 CURRENT waveform and the zero crossings 212 in PHASE 2 CURRENT waveform show that the current does not stop at zero amps. In a micro-step motor operation mode there is a time that the coil is at zero current, however, the time the coil current is a zero current is often too short to allow time to measure the BEMF voltage.

Figure 3:
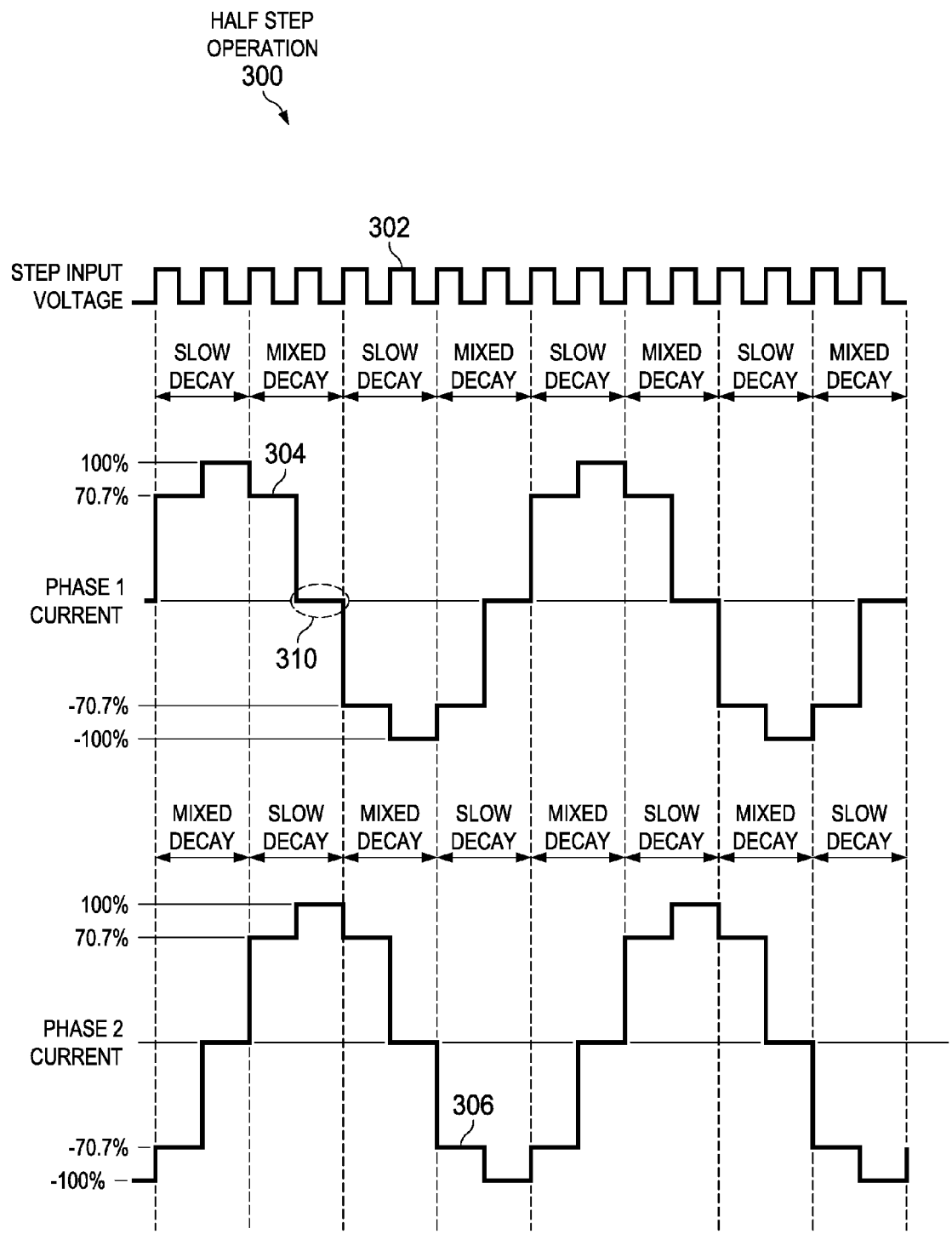
FIG. 3 is a graph showing the phase currents of a stepper motor in half step operation.

FIG. 3 is a graph showing the phase current of a stepper motor in half step operation. In graph 300, the horizontal axis represents time, and the vertical axis represents voltage for the STEP INPUT 302, and current for the PHASE 1 CURRENT 304 and PHASE 2 CURRENT 306. The steady state current level representations for the phase currents are comprised a series of small saw tooth current ramps similar to the enlargement 216 in FIG. 2. In half step operation, the PHASE 1 CURRENT waveform 304 has a portion of time 310 that the drivers are not driving and the current is at zero amps. A BEMF measurement can be made when the phase current is zero and enough time is available for the transient coil voltage to decay revealing the true BEMF voltage. However, as the motor speed increases, the available time for the measurement shortens and eventually the time a measurement can be made is too short for an accurate BEMF measurement. For quarter step or higher step operation, the time at zero current is even smaller, resulting in significant restrictions for measuring BEMF voltage. At higher motor speeds the direct measurement approaches fail for lack of time to complete the BEMF measurement.

Figure 4A:
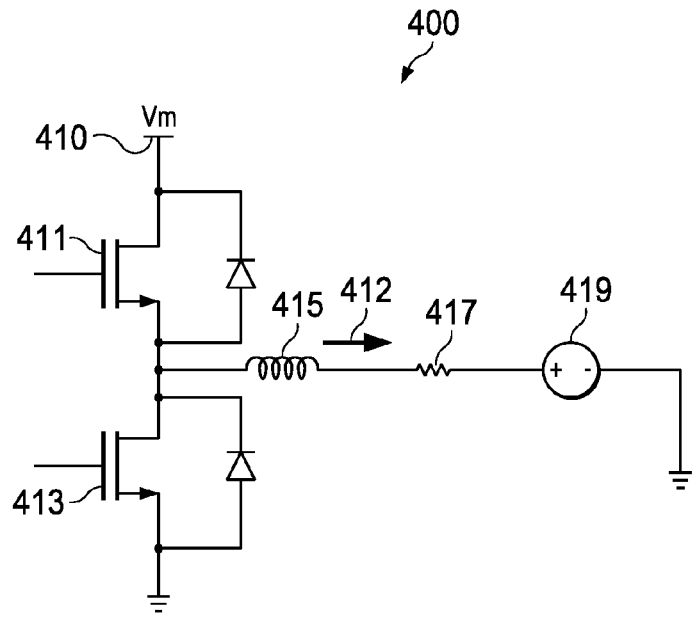
FIGS. 4A and 4B are a schematic for a single motor phase and a corresponding graph of a peak current waveform, respectively.
Figure 4B:
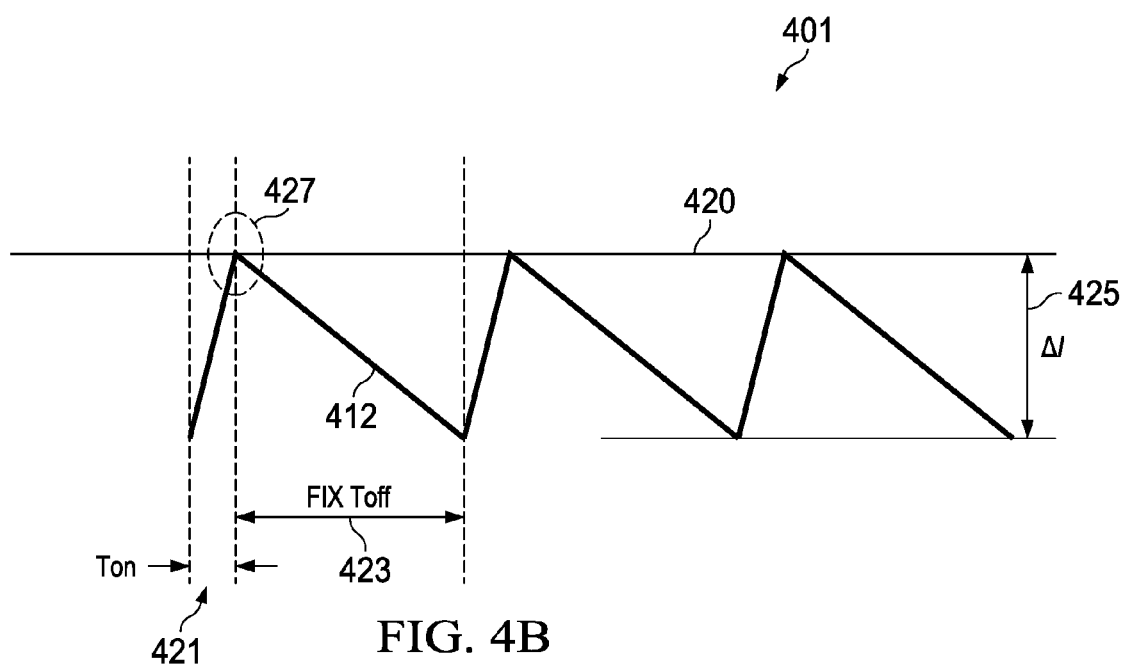

FIGS. 4A and 4B are a schematic for a single motor phase circuit and a corresponding graph of a peak current waveform, respectively. Schematic 400 contains a high side drive transistor 411, a low side drive transistor 413, a motor winding 415, winding resistance 417 and a BEMF voltage shown as a voltage source 419. In this example in FIG. 4A, the high side driver 411 is conducting and the low side driver 413 is off as indicted by the current arrow 412. The high side driver 411 conducts current from the motor voltage Vm labeled 410 through the winding 415, the internal resistance 417, the BEMF voltage 419 and to negative or ground potential. The phase current level (see 412 in FIG. 4B) is regulated by turning the high side driver 411 on to allow the phase current 412 to reach a pre-determined peak current threshold during a time Ton. At that point, the high side driver is turned off (and the low side driver turned on) for a fixed time Toff. At the end of the fixed time Toff, the high side driver is turned back on, and the process repeats. As described hereinabove, this process is known as peak current regulation. The operation is shown in graph 401 in FIG. 4B. The pre-determined current threshold 420 is shown at the peak of the saw tooth phase current 412 waveform in FIG. 4B. At the start of waveform 412, the high side driver (411 in FIG. 4A) conducts during the time Ton labeled 421. After the peak current threshold is met (see 427 in FIG. 4B), the high side driver is turned off for a fixed period Toff 423 and the current decreases in a current difference AI labeled 425. The cycle repeats as shown in waveform 412 of graph 401.

Using schematic 400 and waveform 401, the change in current ΔI can be expressed as in EQ 1:

$$\Delta I = Toff\left(\frac{IR - Vbemf}{L}\right) \quad (1)$$

Where R is the value of resistor 417, the winding resistance, I is the current, Vbemf is the voltage due to BEMF, 419 in FIG. 3A, and L is the inductance of the coil, 415 in FIG. 3A.

The on time, Ton, is given by EQ. 2:

$$Ton = \Delta I\left(\frac{L}{Vm - (IR - Vbemf)}\right) \quad (2)$$

Substituting EQ. 1 into EQ. 2 for ΔI, Ton is given by EQ. 3:

$$Ton = Toff\left(\frac{LIR - Vbemf}{Vm - (IR - Vbemf)}\right) \quad (3)$$

As shown in EQ. 3, the on time Ton varies with Vbemf, which suggests that Ton may be used to measure Vbemf. The on time Ton is used to control the motor driver FETs to supply the voltage Vm to the coil in the motor until the current I reaches a predetermined maximum. The current then decays until the next cycle. Because the on time Ton changes, as shown in FIG. 3, Ton could be used to try to determine the Vbemf. However, in practice there are issues with this measurement. As shown in EQ. 3, Ton varies inversely with the highly variable motor supply voltage Vm, the motor coil resistance R and the voltage Vbemf. With Vm typically being much larger than Vbemf and having high variation in Vm, discriminating Vbemf changes from the Vm changes does not provide a robust detection method. As is described further hereinbelow, using a differential measurement to attempt to cancel out the variation in Vm is also ineffective.

Figure 5:
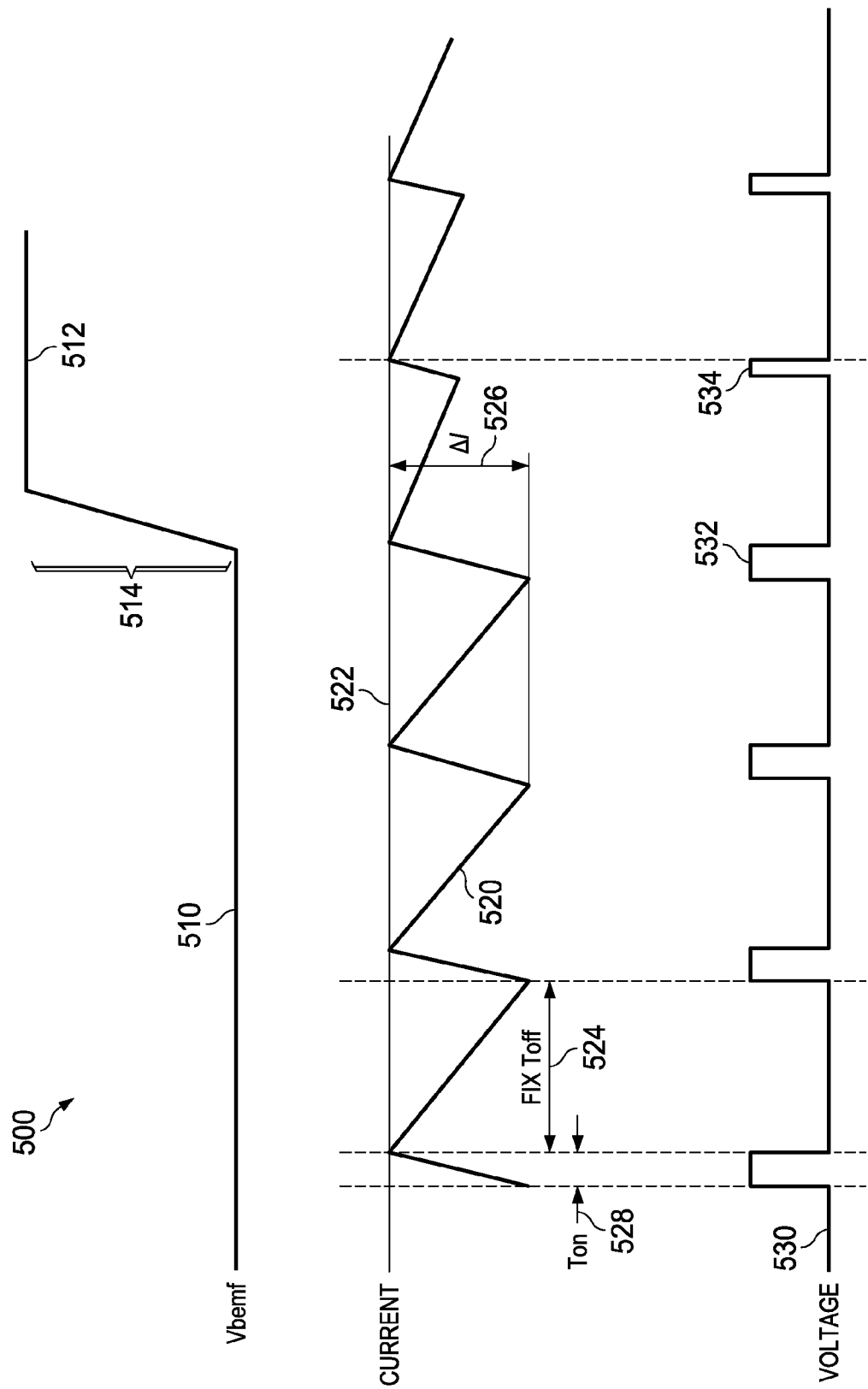
FIG. 5 is a timing diagram that shows a differential Vbemf voltage waveform, a corresponding coil current waveform, and a corresponding on time pulse waveform.

FIG. 5 is a timing diagram that shows a differential Vbemf waveform. Timing diagram 500 has three waveforms: Vbemf 510; drive current 520; and phase timing 530. The horizontal or x axis is time for each of the waveforms in timing diagram 500. The vertical axis for Vbemf 510 is voltage, for drive current 520 it is amps and for the phase timing 530 is voltage. The Vbemf waveform 510 shows an increase in Vbemf voltage, ΔVbemf 514. The drive current waveform 520 shows a peak current threshold 522, a fixed time Toff 524, a delta current ΔI 526 and a Ton 538 that varies. The phase waveform 530 shows two varying turn on voltage pulses Ton of different periods. Ton pulse 532 is longer than Ton pulse 534.

The waveforms in FIG. 5 are another example of the "peak current" method of driving a stepper motor coil. In the peak current method, Toff is constant and Ton varies to drive the current to the programmed threshold (522 in FIG. 5). The change in the on time Ton (ΔTon) is given by EQ. 4:

$$\Delta Ton = Ton1 - Ton2 \text{ or} \quad (4)$$

$$\Delta Ton = Toff\left(\frac{Vm(Vbemf2 - Vbemf1)}{(Vm - (IR - Vbemf1)) \times (Vm - (IR - Vbemf1))}\right)$$

EQ. 4 shows that even when using a differential measurement, the differential measurement ΔTon depends on the varying motor voltage Vm and the product of the current I and the temperature dependent resistance R. Variation in the voltage Vm again obscures the smaller Vbemf voltage.

Figure 6:
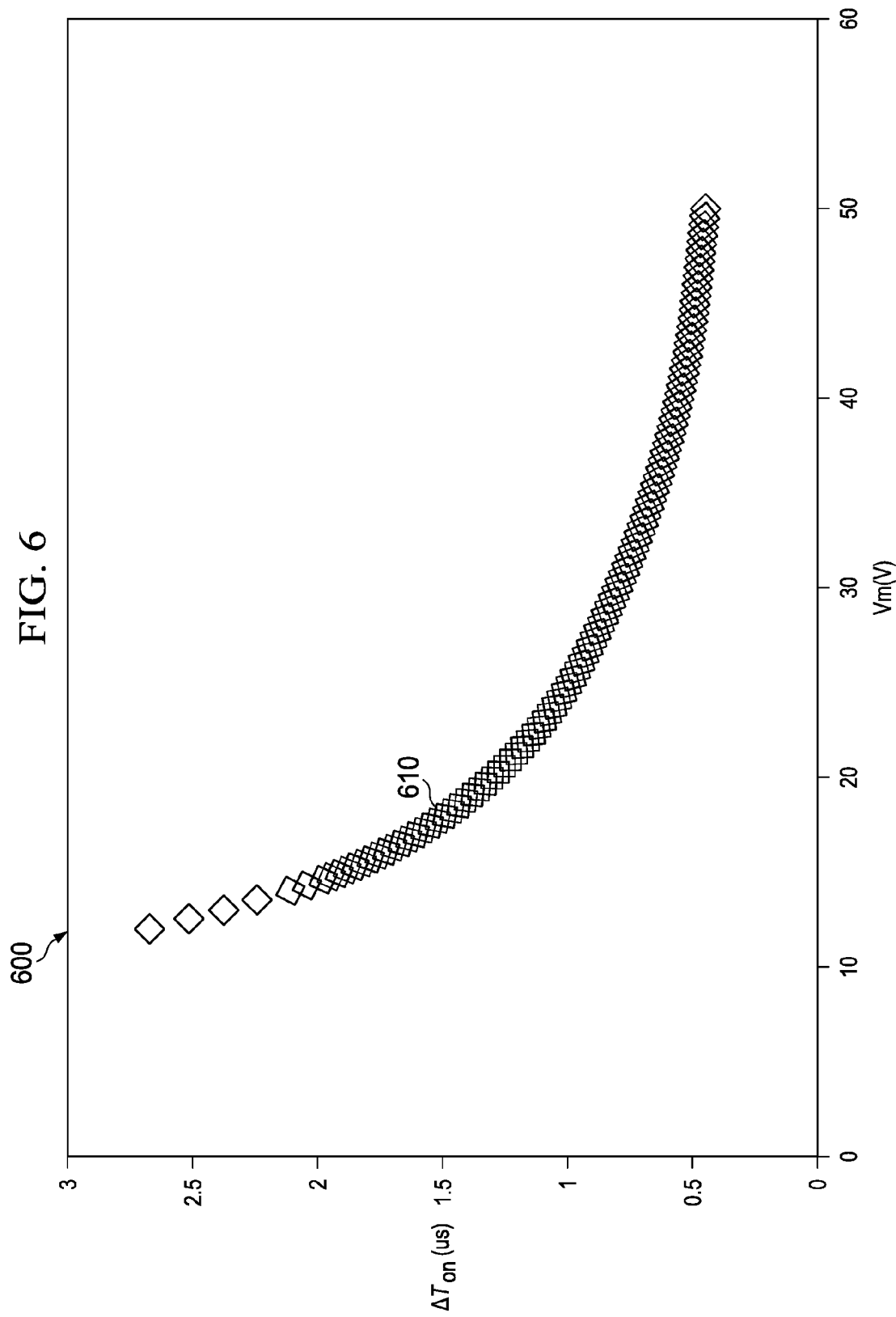
FIG. 6 is a plot of a simulated motor voltage Vm vs a time ΔTon.

FIG. 6 is a plot 600 of a simulated motor voltage Vm, plotted against a differential on time ΔTon, which further illustrates the dependence of the differential quantity ΔTon on the motor voltage Vm. The vertical or Y axis of plot 600 represents ΔTon in micro seconds (uS). The horizontal or X axis represents Vm in Volts (V). Data line 610 shows a simulation of ΔTon while Vm is swept from 10V to 60V. Data line 610 shows that the change of the voltage Vm has a direct and non-linear effect on ΔTon.

An example arrangement of the present application uses a fixed delta current range ΔI instead of a fixed on-time Ton in a stepper motor regulation scheme. The fixed ΔI regulation method removes the dependence of ΔTon on the motor voltage Vm, and therefore enables an accurate and robust assessment of the Bemf voltage. The BEMF measurement is performed without making a direct measure of Vbemf and without requiring the phase current drivers to be disabled. The fixed ΔI regulation method of the arrangements also enables BEMF voltage assessment throughout the entire commutation cycle, even when the motor current I is not zero. The fixed ΔI regulation method also enables determining the BEMF voltage phase in relationship to the phase of the motor current. With the accurate and robust assessment of the Vbemf voltage provided in the example arrangements, Vbemf measurements can enable determining rotor movement without the use of external position sensors and without the associated hardware required to read those external sensors.

Figure 7:
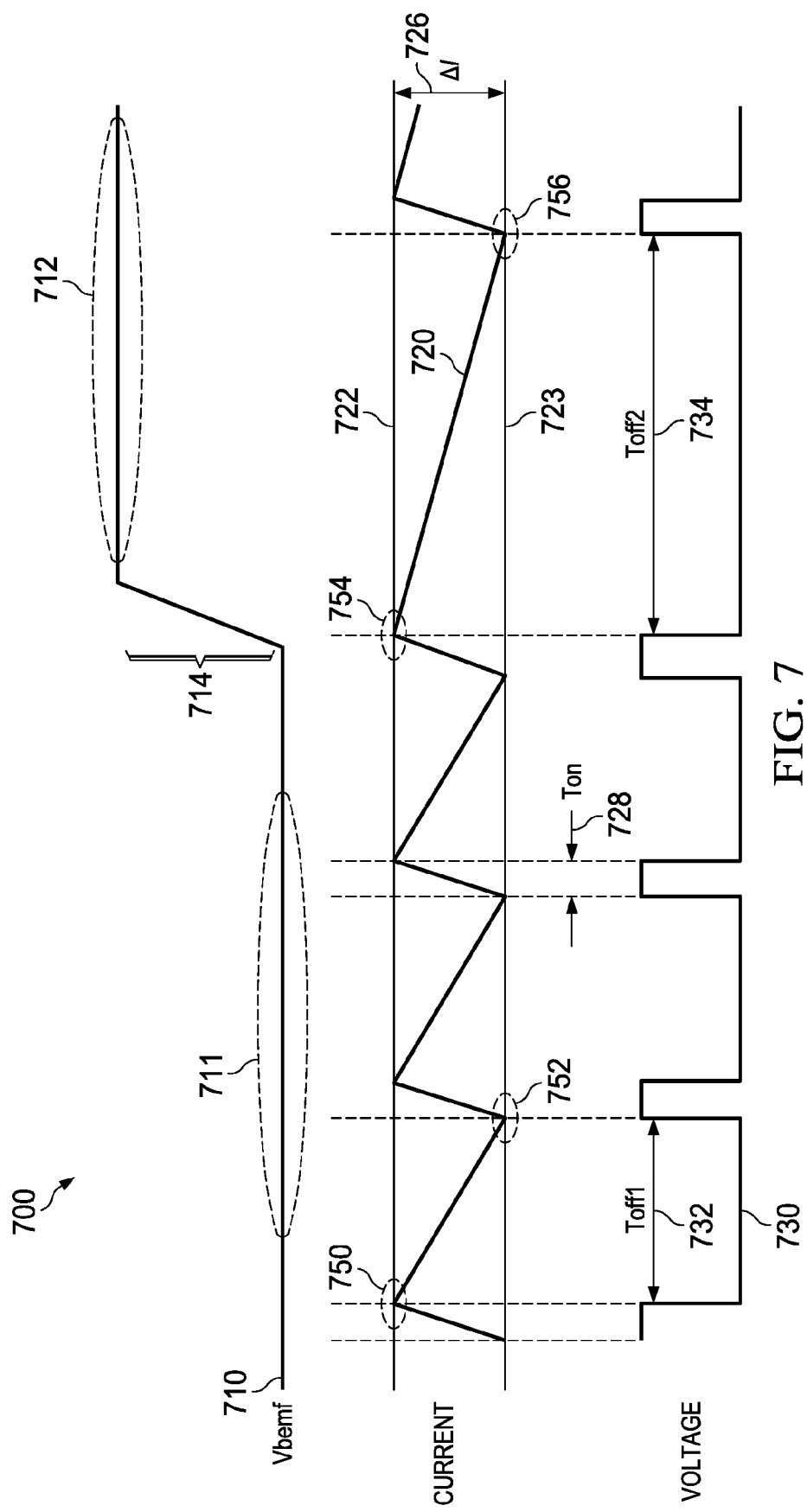
FIG. 7 is a timing diagram showing the differential Vbemf voltage waveform, a corresponding coil current waveform, and a corresponding off time pulse waveform for an example arrangement of a fixed ΔI stepper motor regulation method.

FIG. 7 is a timing diagram showing operation of an arrangement using the fixed ΔI stepper motor regulation method. Timing diagram 700 has three waveforms: Vbemf 710; drive current 720; and phase timing 730. The horizontal or x-axis is time for each of the waveforms in timing diagram 700. The vertical axis for Vbemf 710 is voltage, current for drive current 720 in amps, and voltage for the phase timing 730. The Vbemf waveform 710 shows a differential voltage ΔVbemf 714 between a voltage Vbemf1 in portion 711 and a voltage Vbemf2 I portion 712, similar to the ΔVbemf voltage increase 514 in FIG. 5. The drive current waveform 720 shows a peak current threshold 722, a lower current threshold 723, a fixed delta current ΔI 726 and a Ton 728 that varies. The phase timing waveform 730 shows two varying turn off periods: Toff1 (732) corresponding to the lower Vbemf voltage 711; and Toff2 (734) corresponding to the higher Vbemf voltage 712. Period Toff1 732 is shorter than period Toff2 734. Two areas, 750 and 754, on the drive current waveform 720 occur after the drive current reaches the peak current threshold. Two areas, 752 and 756, on the drive current waveform 720 occur after the drive current reaches the lower current threshold. Note that the on time Ton is shown as more or less constant, the on time is the time the current I needs to rise from the lower threshold 732 to the higher threshold 722 when the motor is driven. The on time is determined by the motor resistance R and while more or less similar in the examples in FIG. 7, Ton can also vary.

In operation, the change in current between the lower threshold and the upper threshold (723, 722) is fixed at ΔI. During the on time Ton the coil current 720 increases until it reaches the peak current threshold 722. Referring to the drive current waveform 720 in FIG. 7, the peak current threshold is attained in area 750. At the time 750, the phase drive 730 turns off and the coil current decays until the coil current reaches the lower current threshold 723 in area 752. The decay period Toff1 732 is dependent on the voltage Vbemf1, coil resistance R and inductance L, but not on the motor voltage Vm. After the current reaches the lower current threshold 723 (shown in area 752) at the end of period Toff1, the process repeats. Following the drive current waveform 720 to area 754, the Vbemf1 711 is transitioning to a higher voltage eVbemf2 (shown at 712). The coil current 720 attains the peak current threshold 722 in area 754, resulting in the phase drive turning off, and the period Toff2 734 begins. Following current drive waveform 720, the current decays to the lower current threshold 723 (shown in area 756). The decay period Toff2 734 is longer than the first Toff1 732 period because the Vbemf level 712 is higher than the Vbemf level 710. After the drive current reaches the lower current threshold (in area 756) at the end of period Toff2 734, the process repeats. The off time Toff is not fixed in the arrangements, instead the current change $\Delta I$ is fixed. Using the Toff1 period, $\Delta I$ is expressed as:

$$\Delta I = Toff1\left(\frac{IR - Vbemf1}{L}\right) \text{ or} \qquad (5)$$

$$\frac{1}{Toff1} = \frac{1}{L\Delta I}(IR - Vbemf1)$$

EQ. 5 shows that use of the example arrangement makes Vbemf1 independent from the highly variable motor voltage Vm. The time Toff1 is only dependent on the coil inductance L, the coil resistance R, the current I, the fixed delta current $\Delta I$, and the Vbemf. The current I is monitored, the inductance L is known, $\Delta I$ is known and the coil resistance R can be characterized for various temperatures and currents I. Using these parameters the voltage Vbemf can be calculated by a controller or other system resource using EQ. 5.

In systems where the change in Vbemf ($\Delta$Vbemf) is desired, the coil current I and the resistance R cancels out of the equation as shown in forming EQ. 6:

$$\frac{1}{Toff2} - \frac{1}{Toff1} = \qquad (6)$$

$$\left(\frac{1}{L\Delta I}(IR - Vbemf2)\right) - \left(\frac{1}{L\Delta I}(IR - Vbemf1)\right) \text{ or } \frac{1}{Toff2} - \frac{1}{Toff1} =$$

$$\frac{1}{L\Delta I}(Vbemf2 - Vbemf1) \text{ or } \Delta Vbemf = L\Delta I\left(\frac{1}{Toff2} - \frac{1}{Toff1}\right)$$

As shown in EQ. 6, a change in the voltage Vbemf, $\Delta$Vbemf, is only dependent on the inductance L of the motor coil, the known delta current range $\Delta I$, and the two measured off times Toff1 and Toff2. The term $\Delta$Vbemf does not depend on the temperature dependent coil resistance R, or on the highly variable motor voltage Vm. Because the change $\Delta$Vbemf is dependent on the length of the Toff periods, a simple counter can be used to calculate $\Delta$Vbemf. Alternatively, a time measurement for Toff1, and Toff2, can be used. The position of the motor can be determined using the change $\Delta$Vbemf. Use of the arrangements of the present application reduces the need for the complicated hardware typically used to directly measure the Vbemf.

Figure 8:
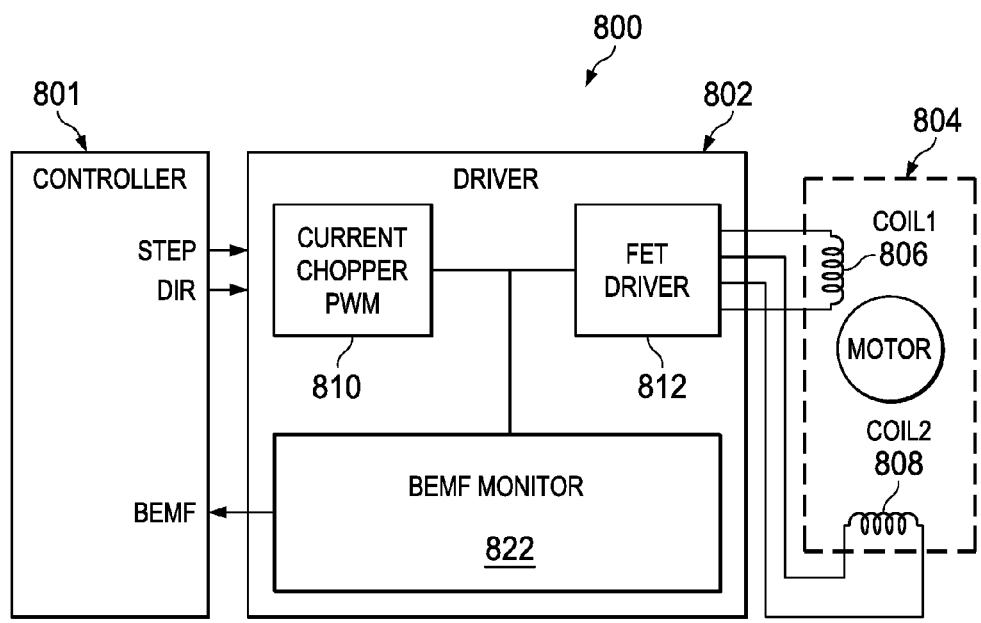
FIG. 8 is a block diagram of a stepper motor controller, stepper motor driver and a stepper motor with an example arrangement for indirectly measuring BEMF.

FIG. 8 is a block diagram of a system including a stepper motor controller, stepper motor driver and a stepper motor with an example arrangement indirectly measuring BEMF. System 800 has a stepper motor CONTROLLER 801, a stepper motor DRIVER 802 and a stepper MOTOR 804. Within the stepper motor 804, a pair of coils is shown: COIL1 806 and COIL2 808. Within the stepper motor driver 802, there are three blocks: CURRENT CHOPPER PWM 810, FET DRIVER 812 and BEMF MONITOR 822.

CONTROLLER 801 has at least two outputs: STEP and DIR which are coupled to the DRIVER 802. CONTROLLER 801 receives input BEMF from BEMF MONITOR 822 within DRIVER 802. CURRENT CHOPPER PWM 810 is coupled to FET DRIVER 812 and BEMF MONITOR 822. FET DRIVER 812 is coupled to COIL1 806 and COIL2 808.

In an example arrangement, the DRIVER 802 can be implemented as a single monolithic integrated circuit. In another example arrangement, the DRIVER 802 and the CONTROLLER 801 can be implemented on a single integrated circuit. The CONTROLLER 801 can be implemented using a programmable device such as a microprocessor, a microcontroller unit, or by logic circuitry such as a state machine. User definable integrated circuits such as field programmable gate arrays (FPGAs), complex logic programmable devices (CPLDs), and application specific integrated circuits (ASICs) can be used to implement the CONTROLLER 801, and in alternative arrangements, can also include DRIVER 802. Digital signal processors (DSPs) and mixed signal processors (MSPs) can also be used to implement the arrangements.

In operation, the CONTROLLER 801, which can be a microprocessor, microcontroller unit or other logic device, provides step and direction signals STEP and DIR to the DRIVER 802. In response to the step and direction signals, the DRIVER 802 activates the CURRENT CHOPPER PWM 810 to provide pulse signals regulated by using a predetermined current change $\Delta I$ to the FET DRIVER 812. This driver operates as shown in waveform 730 from FIG. 7. The FET DRIVER 812 drives COIL1 806 for one phase and COIL2 808 for a second phase of the stepper motor. In one example, BEMF MONITOR 822 counts the pulse rate of the CURRENT CHOPPER 810 Toff output and provides the count rate information to the controller via the BEMF signal. In another example, a high frequency reference clock (such as 20 MHz) within BEMF MONITOR 822 is used to measure the Toff pulse width in time, and the time is supplied as an output on the BEMF signal. The CONTROLLER 801 receives the BEMF signal information, calculates a BEMF value and incorporates it into subsequent step and direction signals. The CONTROLLER 801 can determine the position of the stepper motor using a direct calculation for the voltage Vbemf or by tracking changes in the BEMF ($\Delta$Vbemf) to track motor steps. Equations 5 and 6 described hereinabove can be calculated by the controller 801.

In comparing the example arrangement for stepper motor driver 802 to the stepper motor driver 102 in FIG. 1, the amount and complexity of hardware required for stepper motor driver 802 is reduced by the pair of AFEs 126 and 136 and the ADCs 124 and 134 that are shown in stepper motor driver 102 of FIG. 1. Further, the ability of stepper motor driver 802 to indirectly determine the BEMF voltage at any time during the commutation cycle and in any stepping mode makes the stepper motor driver 802 containing an example arrangement that is more robust for determining and using the BEMF voltage for rotor movement.

Figure 9:
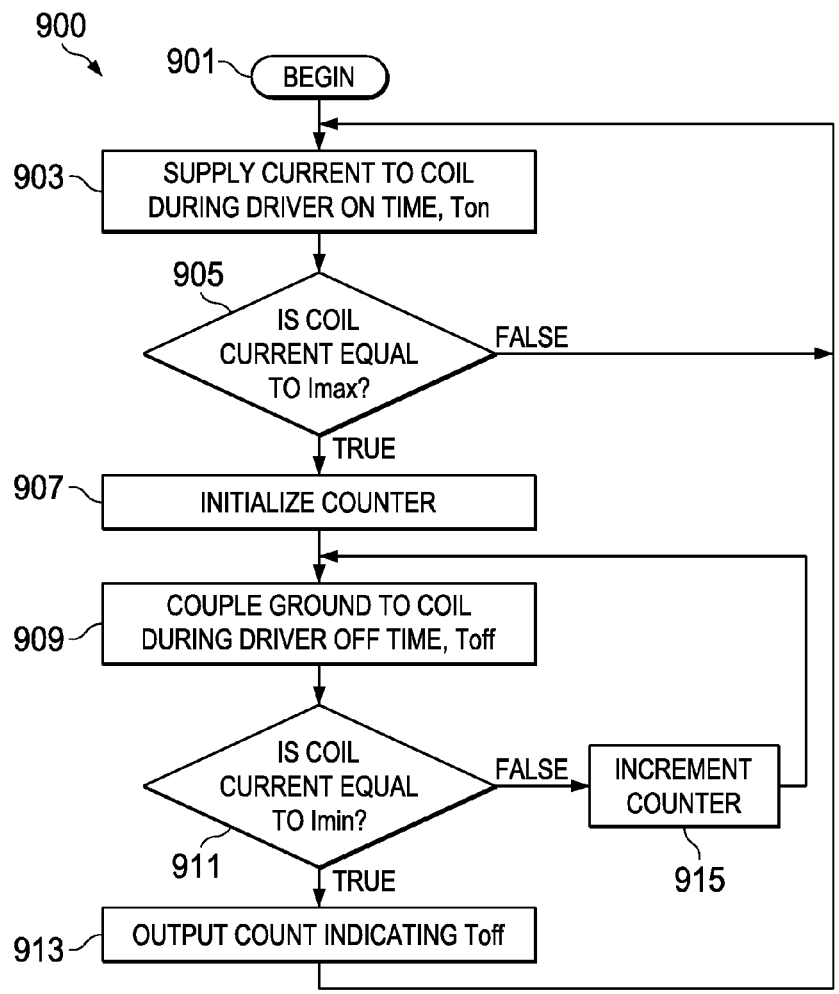
FIG. 9 is a flow diagram for a method arrangement.

FIG. 9 is a flow diagram illustrating a method arrangement 900. In FIG. 9, a method for determining the length of the off time Toff for a driver supplying a fixed delta current to a stepper motor is shown. As seen in EQ. 5, since the current change $\Delta I$ is known, the off time Toff can be used to determine the voltage due to the BEMF, Vbemf, using the current I, resistance R, and inductance L values.

The method begins at step 901, Begin. The method transitions to step 903, where the driver begins supply current to the coil for a phase of the stepper motor such as shown in FIG. 1. In an example, a high side driver device such as a power FET couples the coil to a motor voltage Vm. The method transitions to step 905, where the current is tested. The current through the coil, the coil current, is monitored. If the decision at step 905 is false, F, the method continues to supply the current to the coil at step 903. The method transitions when the current reaches a predetermined maximum value Imax, such as shown in FIG. 7, to step 907.

At step 907, a counter is initialized. The counter can reside in the BEMF monitor block 822 in FIG. 8, for example. The method then continues to step 909. At step 909, the off time Toff is performed by coupling the coil to a ground potential. The method transitions to a decision block 911 where the coil current is tested. If the coil current is greater than a minimum current Imin, the method transitions to step 915 and increments the counter. The method then continues to perform the off time Toff at method step 909, testing the current against the predetermined minimum current as shown in FIG. 7 until the current reaches the minimum current. While the current is greater than the minimum current Imin, the counter will be incremented at step 915 to count the time for the Toff period. When the decision at block 911 is true, the method outputs the count indicating the time period Toff. The method then continues by returning to the step 903 and supplying current to the motor. The cycle the repeats. As shown in FIG. 7, the method supplies current using a fixed current change ΔI to regulate the current to the motor coil.

Figure 10:
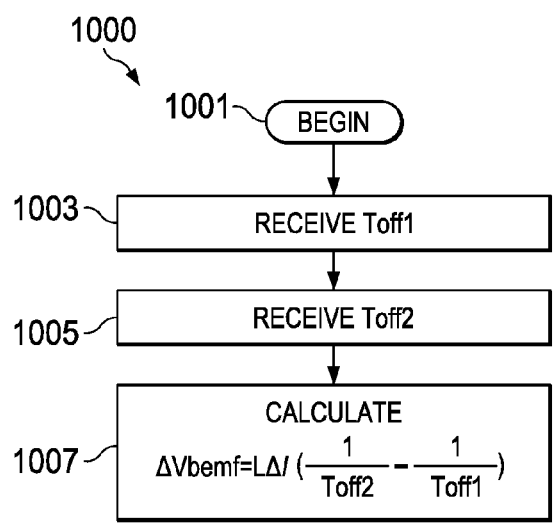
FIG. 10 is a flow diagram for an alternative method arrangement

FIG. 10 illustrates in a flow diagram a method 1000 for using the Toff counter measurements (or alternatively, the Toff time) to determine a change in the BEMF voltage, ΔVbemf. In FIG. 8, the method of FIG. 10 can be implemented within the controller 801.

In FIG. 10, the method begins at step 1001. At step 1003, a first value for an off time Toff1 is received. In an example, the controller 801 can receive the off time count from a BEMF monitor 822. The Toff count corresponds to the duration of the time Toff. At step 1005, a second off time Toff2 is received. Again, in the FIG. 8, the controller 801 can receive a second off time count from the BEMF monitor 822. At step 1007, the change in ΔVbemf is calculated using EQ. 6 described hereinabove. The position of the motor can be determined using the change in Vbemf. For example, as shown in FIG. 7, the change ΔVbemf corresponds to a position change.

In an alternative approach, the controller 801 in FIG. 8 could use the voltage Vbemf and EQ. 5 to determine motor position. The calculation in EQ. 5 depends on the resistance R, which is temperature dependent.

In the arrangements, the voltage Vbemf for a stepper motor can be determined even for full step operation. By utilizing a fixed range for the current as a regulation method, the arrangements enable the BEMF voltage Vbemf, or a change in Vbemf, to be determined independent of the voltage Vm; and without a zero current condition occurring. Motor position can be determined using the BEMF voltages.

Modifications are possible in the described example arrangements, and other arrangements are possible within the scope of the claims

What is claimed is:

1. A method comprising:
supplying a pulse width modulated signal with an on time and an off time to a coil in a stepper motor in cycles, the on time being proportional to a time to increase a current to the coil from a predetermined minimum current to a predetermined maximum current, the off time being proportional to a time to decrease the current in the coil from the predetermined maximum current to a predetermined minimum current;
in a first cycle supplying the pulse width modulated signal, measuring a first off time;
in a second cycle supplying the pulse width modulated signal, measuring a second off time; and
using a difference between the first off time and the second off time, determining a change in a voltage due to back electromotive force (BEMF) for the stepper motor.

2. The method of claim 1, in which measuring the first off time includes counting pulses of a known frequency during the first off time, and storing a first count that is proportional to the first off time.

3. The method of claim 2, in which measuring the second off time includes counting pulses of a known frequency during the second off time, and storing a second count that is proportional to the second off time.

4. The method of claim 3, in which the first count and the second count are formed using a counter in a back electromotive force monitor coupled to a drive circuit supplying the current to the coil.

5. The method of claim 1 in which using a difference between the first off time and the second off time further includes subtracting the second off time from the first off time.

6. The method of claim 1 in which determining the change in a voltage due to back electromotive force ΔVbemf for the stepper motor includes calculating:

$$\Delta Vbemf = L\Delta I \left( \frac{1}{Toff2} - \frac{1}{Toff1} \right)$$

where Toff1 is the first off time, Toff2 is the second off time, ΔI is the difference between the predetermined maximum current and the predetermined minimum current, and L is an inductance of the coil.

7. A method for determining a back electromotive force (BEMF) voltage for a stepper motor, comprising:
supplying a voltage to a coil in a stepper motor for an on time that corresponds to increasing a current in the coil to a predetermined maximum current;
removing the voltage to the coil in the stepper motor for an off time that corresponds to allow the current in the coil to decrease to a predetermined minimum current;
counting a number of pulses of a known frequency to form a count corresponding to a duration of the off time; and
determining a voltage due to the BEMF using the change in the current between the predetermined minimum current and the predetermined maximum current, the off time, an inductance of the coil, a current in the coil, and a resistance of the coil.

8. The method of claim 7, in which determining the voltage due to the BEMF includes calculating:

$$\frac{1}{Toff1} = \frac{1}{L\Delta I}(IR - Vbemf1)$$

where Toff1 is the off time, ΔI is a fixed delta current that is a difference between the predetermined maximum current and the predetermined minimum current, L is the inductance of the coil, I is a constant current to the coil, R is the resistance of the coil, and Vbemf1 is the voltage due to the BEMF.

9. The method of claim 8, and further including using the Vbemf1 voltage to determine a position of the stepper motor.

10. An apparatus, comprising:
   an FET driver circuit configured to supply current to a coil in a stepper motor, the FET driver circuit configured to regulate the current to the coil using a fixed delta current ΔI;
   a current chopper pulse width modulated circuit coupled to the FET driver circuit configured to supply pulses corresponding to a step control signal and a direction control signal;
   a back electromotive force (BEMF) monitor coupled to the current chopper circuit configured to measure an off time pulse and to output a BEMF monitor signal;
   a controller coupled to the current chopper pulse width modulated circuit to supply the step and direction control signals and coupled to receive the BEMF monitor signal;
   in which the BEMF monitor includes a counter that counts during an off time pulse from the current chopper pulse width modulated circuit to form a count corresponding to the off time duration; and
   in which the controller receives the count corresponding to the off time Toff1 for the off time pulse, and the controller is configured to determine a voltage due to the BEMF by calculating:

$$\frac{1}{Toff1} = \frac{1}{L\Delta I}(IR = Vbemf1)$$

where ΔI is the fixed delta current, L is an inductance of the coil, R is a resistance of the motor, I is a constant current to the motor, and Vbemf1 is the voltage due to the BEMF.

11. The apparatus of claim 10, in which the FET driver is configured to supply the current to the coil during an on time until the current increases to a predetermined maximum current, and the FET driver is configured to stop supplying current to the coil during an off time that continues until the current decreases to a predetermined minimum current, a difference between the predetermined maximum current and the predetermined minimum current being the fixed delta current ΔI.

12. The apparatus of claim 10, in which the controller is configured to receive a first count corresponding to a first off time for a first motor operation, and configured to receive a second count corresponding to a second off time for a second motor operation, and is configured to determine a change in the voltage due to the BEMF, ΔVbemf, by calculating:

$$\Delta Vbemf = L\Delta I \left( \frac{1}{Toff2} - \frac{1}{Toff1} \right)$$

where Toff2 corresponds to the second count, Toff1 corresponds to the first count, ΔI is the fixed delta current, and L corresponds to an inductance of the coil.

13. The apparatus of claim 12, in which the controller is configured to determine a motor position corresponding to the change in the voltage due to the BEMF.

14. The apparatus of claim 10, in which the current chopper pulse width modulated circuit, the FET driver circuit, and the BEMF monitor are formed on a monolithic integrated circuit.

15. The apparatus of claim 10, in which the stepper motor includes the coil as a first coil, and further includes at least a second coil.

* * * * *